(12) United States Patent
Sakai

(10) Patent No.: US 7,004,029 B2
(45) Date of Patent: Feb. 28, 2006

(54) SEMICONDUCTOR DYNAMIC QUANTITY SENSOR

(75) Inventor: Minekazu Sakai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/856,858

(22) Filed: Jun. 1, 2004

(65) Prior Publication Data

US 2004/0237652 A1  Dec. 2, 2004

(30) Foreign Application Priority Data

Jun. 2, 2003  (JP) .............................. 2003-156725

(51) Int. Cl.
  *G01P 15/125*  (2006.01)
  *G01P 15/00*  (2006.01)

(52) U.S. Cl. ............... 73/514.32; 73/514.29; 73/504.12

(58) Field of Classification Search ............. 73/514.32, 73/514.29, 504.04, 504.12, 504.13, 504.14, 73/504.15
See application file for complete search history.

(56) References Cited

U.S. PATENT DOCUMENTS 5,350,189 A * 9/1994 Tsuchitani et al. .......... 280/735
5,417,312 A * 5/1995 Tsuchitani et al. ...... 188/181 A
5,461,916 A   10/1995 Fujii et al.
5,719,336 A * 2/1998 Ando et al. .............. 73/514.32
5,747,991 A * 5/1998 Ito et al. ..................... 324/661
6,854,330 B1 * 2/2005 Potter ...................... 73/514.25

FOREIGN PATENT DOCUMENTS

JP   A-H09-113534   5/1997
JP   A-H10-178184   6/1998

* cited by examiner

*Primary Examiner*—Helen C. Kwok
(74) *Attorney, Agent, or Firm*—Posz Law Group, PLC

(57) ABSTRACT

In a semiconductor acceleration sensor (S1), above one side of a first silicon substrate (10) made of a semiconductor and serving as a fixed electrode (11), a moving electrode (20) made of a semiconductor and displaceable in the thickness direction of the first silicon substrate (10) is disposed apart from and facing the first silicon substrate (10). An applied acceleration is detected on the basis of capacitance changes between the moving electrode (20) and the face of the first silicon substrate (10) accompanying displacement of the moving electrode (20). A space and an electrically insulative insulating layer (13) having a relative permittivity larger than that of air are interposed between the moving electrode (20) and the face of the first silicon substrate (10), side by side in the direction in which the moving electrode (20) and the first silicon substrate (10) are apart.

12 Claims, 6 Drawing Sheets

SEMICONDUCTOR DYNAMIC QUANTITY SENSOR

CROSS REFERENCE TO RELATED APPLICATIONS

This application is based upon, claims the benefit of priority of, and incorporates by reference the contents of Japanese Patent Application No. 2003-156725 filed on Jun. 2, 2003.

FIELD OF THE INVENTION

This invention relates generally to a capacitance-type semiconductor dynamic quantity sensor and, more particularly, to such a sensor that has a moving electrode and a fixed electrode formed apart from each other on a semiconductor substrate and detects an applied dynamic quantity on the basis of capacitance changes between the electrodes.

BACKGROUND OF THE INVENTION

A semiconductor dynamic quantity sensor is generally made by processing a semiconductor substrate to form a moving electrode and a fixed electrode apart from and facing each other, and detects an applied dynamic quantity such as an acceleration or an angular velocity on the basis of capacitance changes between the moving electrode and the fixed electrode accompanying displacement of the moving electrode when the dynamic quantity is applied.

For example, a semiconductor acceleration sensor has been proposed in JP-A-9-113534 (hereafter "Patent Document 1") in which a supporting substrate made of a semiconductor serves as a fixed electrode and a moving electrode made of a semiconductor and displaceable in the thickness direction of the supporting substrate is disposed above one side of the supporting substrate, apart from and facing it, and which detect an applied acceleration on the basis of capacitance changes occurring between the moving electrode and one side of the supporting substrate when the acceleration is applied. In Patent Document 1, the moving electrode is rectangular and its four corners are anchored by flexible spring parts forming the shape of a swastika.

A semiconductor acceleration sensor of this kind has also been proposed in JP-A-10-178184 (hereafter "Patent Document 2") in which a combtooth shaped moving electrode and a combtooth shaped fixed electrode face each other in a meshing state and which detect the application of acceleration in the horizontal direction of the semiconductor substrate.

However, in capacitance-type semiconductor dynamic quantity sensors of this kind, improvements in detection sensitivity are needed, and to achieve these improvements, it is necessary to increase the capacitance between the moving electrode and the fixed electrode, that is, the detection capacitance.

This detection capacitance can be increased by increasing the electrode sizes and thereby increasing the facing area of the electrodes; however, increasing the facing area like this causes the problem of increased size of the sensor.

SUMMARY OF THE INVENTION

It is therefore an object of the present invention to increase the detection sensitivity of a capacitance-type semiconductor dynamic quantity sensor with a minimal increase in size.

To achieve this object and other objects, a first aspect of the invention provides a semiconductor dynamic quantity sensor having a moving electrode and a fixed electrode apart from and facing each other formed by processing a semiconductor substrate, the semiconductor dynamic quantity sensor detecting an applied dynamic quantity on the basis of a capacitance change between the moving electrode and the fixed electrode accompanying displacement of the moving electrode occurring when the dynamic quantity is applied, wherein a space and an electrically insulative insulating layer having a larger relative permittivity than air are interposed side by side between the moving electrode and the fixed electrode in the direction in which the electrodes are apart.

Whereas in related art there has only been a space between the moving electrode and the fixed electrode, in this invention, in addition to a space, an insulating layer with a relative permittivity greater than that of air is also interposed there.

Consequently, the permittivity of the capacitor part between the moving electrode and the fixed electrode, i.e. the detection capacitor part, is greater than in related art, and as a result it is possible to increase the detection capacitance without greatly increasing the facing area of the electrodes.

Thus, with this invention, in a capacitance-type semiconductor dynamic quantity sensor, it is possible to raise detection sensitivity while keeping size increase to a minimum.

Here, according to a second aspect of the invention, the insulating layer can be provided on at least one of the facing sides of the moving electrode and the fixed electrode.

According to a third aspect of the invention, the insulating layer can be provided on both of the facing sides of the moving electrode and the fixed electrode.

And according to a fourth aspect of the invention, the insulating layer can be made up of a plurality of insulating films of different types.

A fifth aspect of the invention provides a semiconductor dynamic quantity sensor having a supporting substrate constituting a fixed electrode made of a semiconductor and disposed apart from and facing one side of a moving electrode made of a semiconductor and displaceable in the thickness direction of the supporting substrate, the semiconductor dynamic quantity sensor detecting an applied dynamic quantity on the basis of a capacitance change between the moving electrode and the side of the supporting substrate accompanying displacement of the moving electrode occurring when the dynamic quantity is applied, wherein a space and an electrically insulative insulating layer having a larger relative permittivity than air are interposed side by side between the moving electrode and the side of the supporting substrate in the direction in which the moving electrode and the supporting substrate are apart.

Whereas in related art there has only been a space between the moving electrode and the side of the supporting substrate constituting the fixed electrode, in this invention, in addition to a space, an insulating layer with a relative permittivity greater than that of air is also interposed there.

Consequently, the permittivity of the capacitor part between the moving electrode and the side of the supporting substrate, i.e. the detection capacitor part, is greater than in related art, and as a result it is possible to increase the detection capacitance without greatly increasing the facing area of the moving electrode and the supporting substrate.

Thus, with this invention, in a capacitance-type semiconductor dynamic quantity sensor, it is possible to raise detection sensitivity while keeping size increase to a minimum.

Here, according to a sixth aspect of the invention, the insulating layer can be provided on at least one of the facing sides of the moving electrode and the supporting substrate.

According to a seventh aspect of the invention, the insulating layer can be provided on both of the facing sides of the moving electrode and the supporting substrate.

And according to an eighth aspect of the invention, the insulating layer can be made up of a plurality of insulating films of different types.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
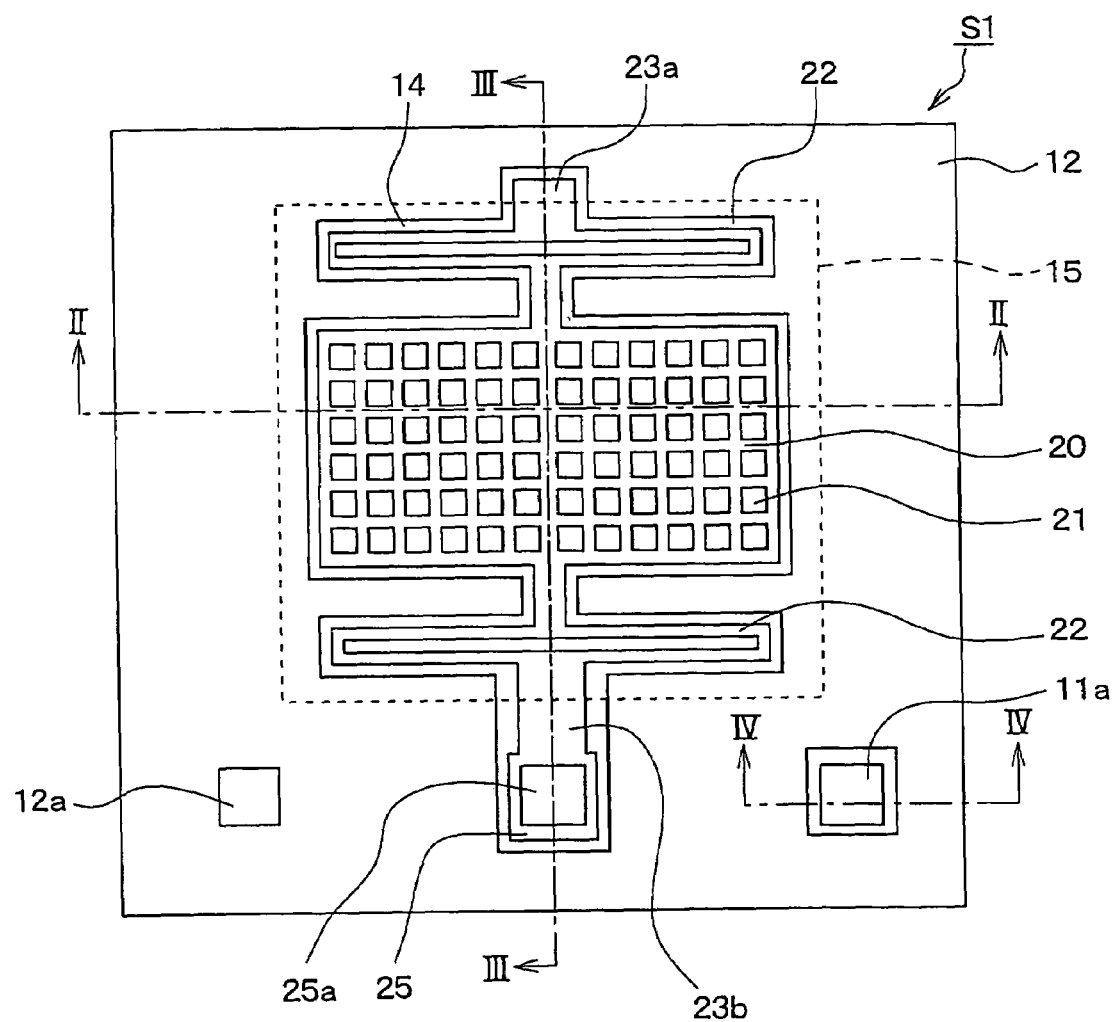
FIG. 1 is a schematic plan view of a semiconductor acceleration sensor according to a preferred embodiment.

The invention will now be described in detail with reference to a preferred embodiment shown in the accompanying drawings. FIG. 1 is a schematic plan view of a capacitance-type acceleration sensor S1 constituting a semiconductor dynamic quantity sensor according to a preferred embodiment of the present invention, FIG. 2 is a schematic sectional view of this acceleration sensor S1 on the line II—II in FIG. 1, and FIG. 3 is a schematic sectional view of the acceleration sensor S1 on the line III—III in FIG. 1.

This acceleration sensor S1 can for example be applied as a vehicle acceleration sensor or gyro sensor for performing operational control of an air bag, ABS or VSC or the like. The acceleration sensor S1 is fabricated by known micromachining being carried out on a semiconductor substrate.

Figure 2:
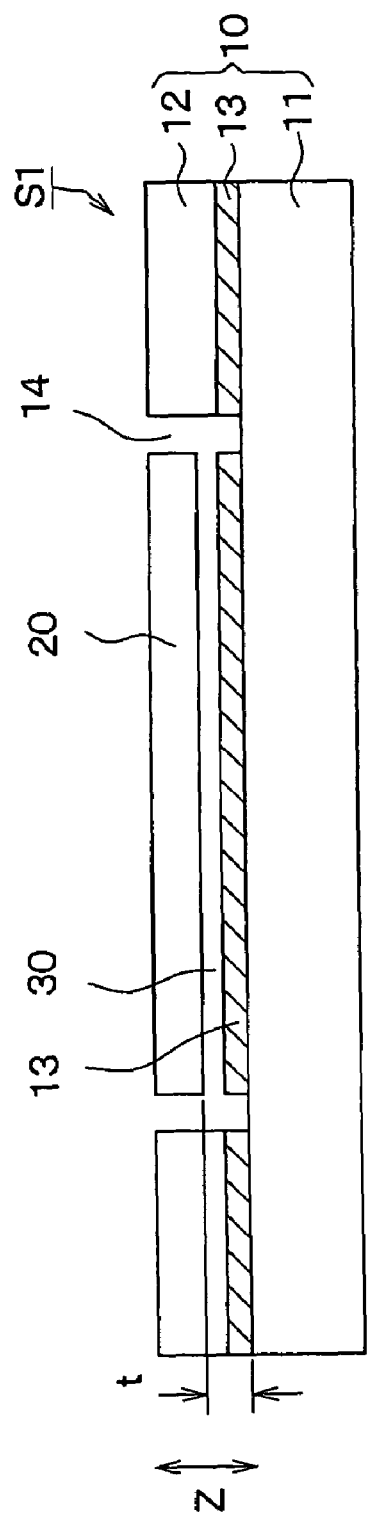
FIG. 2 is a schematic sectional view on a line II—II in FIG. 1.
Figure 3:
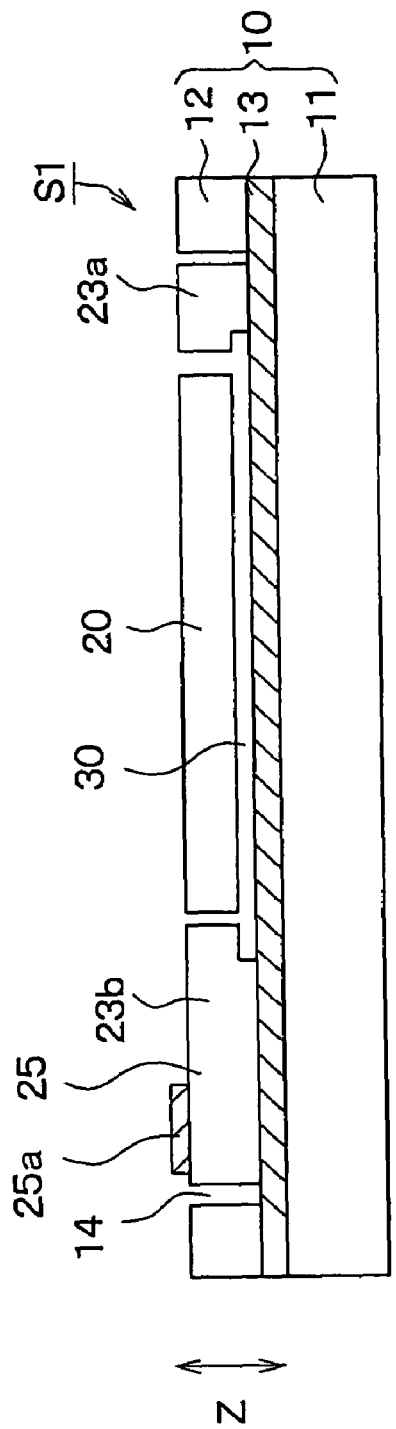
FIG. 3 is a schematic sectional view on a line III—III in FIG. 1.

As shown in FIG. 2 and FIG. 3, the semiconductor substrate constituting the acceleration sensor S1 is a rectangular SOI substrate 10 having a silicon oxide film 13 as an insulating layer between a first silicon substrate 11 serving as a first semiconductor layer and a second silicon substrate 12 serving as a second semiconductor layer. And of the SOI substrate 10, the first silicon substrate 11 is provided as a supporting substrate.

A moving electrode 20 is formed by slits 14 being formed in the second silicon substrate 12. In this example this moving electrode 20 is rectangular and has multiple through holes 21 passing through it in its thickness direction, and it is supported on the first silicon substrate 11 constituting the supporting substrate displaceably in the thickness direction of the first silicon substrate 11.

Specifically, as shown in FIG. 2 and FIG. 3, a part of the silicon oxide film 13 side of the second silicon substrate 12 is removed so that the moving electrode 20 floats above the silicon oxide film 13. This part of the second silicon substrate 12 from which the silicon oxide film 13 side part has been removed is the part positioned within the area 15 shown with a rectangular broken line in FIG. 1.

As shown in FIG. 1 and FIG. 3, the moving electrode 20 is disposed so as to cross the central part of the SOI substrate 10, and the ends of the moving electrode 20 are integrally connected to anchor parts 23a and 23b by spring parts 22. Here, the anchor parts 23a and 23b are fixed parts supported on the first silicon substrate 11 via the silicon oxide film 13.

The spring parts 22 each form a rectangular frame consisting of two parallel beams connected at their ends, and the moving electrode 20 has a spring function of displacing elastically in the thickness direction of the first silicon substrate 11. Specifically, the spring parts 22 allow the moving electrode 20 to displace in the arrow Z direction when it undergoes an acceleration including a component in the arrow Z direction in FIG. 2 and FIG. 3, and restore it to its original state when the acceleration ceases.

In this way, the moving electrode 20 is formed above one side of the first silicon substrate 11 serving as a supporting substrate, facing said side a predetermined gap t (see FIG. 2) away from it, and is displaceable in the displacement direction of the spring parts 22, i.e. the above-mentioned arrow Z direction, in correspondence with an applied acceleration.

And when an acceleration is applied, the gap t between the moving electrode 20 and the face of the first silicon substrate 11 varies with the displacement of the moving electrode 20. Hereinafter, the arrow Z direction will be called the displacement direction Z.

Here, in this acceleration sensor S1, the first silicon substrate 11 facing the moving electrode 20 is also constituted as a fixed electrode. And, as shown in FIG. 2 and FIG. 3, in this preferred embodiment, between the moving electrode 20 and the first silicon substrate (fixed electrode) 11 facing each other across the predetermined gap t, a space 30 and an electrically insulative insulating layer 13 having a larger relative permittivity than air are interposed side by side in the direction in which the moving electrode 20 and the first silicon substrate 11 are apart (i.e. the displacement direction Z).

In this example, the insulating film 13 is a silicon oxide film ($SiO_2$) provided on the facing side of the first silicon substrate 11, as mentioned above, and is formed by thermal oxidation, sputtering or vapor deposition or the like. In the terrestrial atmosphere the space 30 is a layer of air, in a vacuum atmosphere it is a vacuum space, and in another gas atmosphere it is a layer of the gas constituting that atmosphere.

As shown in FIG. 1 and FIG. 3, a moving electrode interconnection part 25 is integrally connected to the anchor part 23b, and a moving electrode pad 25a for wire bonding is formed at a predetermined position on this interconnection part 25.

Figure 4:
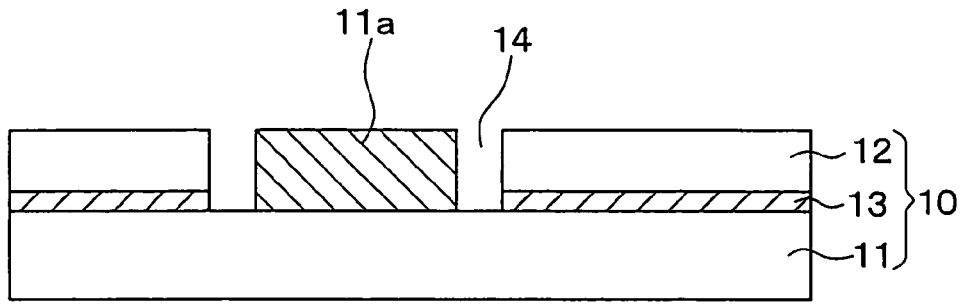
FIG. 4 is a schematic sectional view on a line IV—IV in FIG. 1.

And, as shown in FIG. 1, a fixed electrode pad 11a for wire bonding is electrically connected to the first silicon substrate 11 serving as the fixed electrode. The sectional construction of this fixed electrode pad 11a is shown in FIG. 4 as a section on the line IV—IV in FIG. 1.

And, as shown in FIG. 1, a reference potential pad 12a for keeping the part of the second silicon substrate 12 peripheral to the moving electrode 20 at a fixed potential is formed on this peripheral part. These electrode pads 11a, 12a and 25a are formed with, for example, aluminum.

For example the rear side of the first silicon substrate 11 of this acceleration sensor S1, that is, the opposite side to the silicon oxide film 13, is fixed to a package (not shown) by way of an adhesive or the like, and circuit means for controlling the acceleration sensor S1 is provided in this package.

This circuit means and the electrode pads 11a, 12a and 25a are electrically connected by wires (not shown) formed by gold or aluminum wire bonding or the like.

This acceleration sensor S1 may be manufactured, for example, as follows. Using photolithography, a mask of a shape corresponding to the moving electrode 20 including the through holes 21, the spring parts 22 and the anchor parts 23a and 23b is formed on the second silicon substrate 12 of the SOI substrate 10, and then trench etching is carried out by dry etching using a gas such as $CF_4$ or $SF_6$ to form the pattern of slits 14 shown in FIG. 1.

In this trench etching, compared to the etching pattern positioned within the area 15 in FIG. 1, in the etching pattern positioned outside this area 15, the part to remain is wider. In the moving electrode 20, narrow parts to remain are realized by the through holes 21.

Because of this, in the part of the second silicon substrate 12 positioned within the area 15 in FIG. 1, the bottom of the second silicon substrate 12 is removed by side etching, so that the second silicon substrate 12 floats above the silicon oxide film 13; and outside the area 15, the bottom of the second silicon substrate 12 remains.

Consequently, in the second silicon substrate 12, a part floating above the oxide film 13 and a part in contact with and supported by the oxide film 13 are formed, and as a result a moving electrode 20, spring parts 22, and anchor parts 23a and 23b are formed, divided by the slits 14. Also, by sputtering or vapor deposition of aluminum being carried out, the above-mentioned electrode pads 11a, 12a and 25a are formed, and the acceleration sensor S1 is completed.

In this acceleration sensor S1, a detection capacitance is formed between the moving electrode 20 and the first silicon substrate 11 serving as the fixed electrode. And, when it undergoes an acceleration, on the basis of the spring function of the spring parts 22, the whole of the moving electrode 20 displaces integrally in the displacement direction Z, and in correspondence with this displacement the detection capacitance changes. And on the basis of this variation in capacitance, the acceleration is detected.

Now, this preferred embodiment has the major characteristic feature that, between the moving electrode 20 and the face of the first silicon substrate 11 constituting the fixed electrode and serving as the supporting substrate, a space 30 and an insulating layer 13 that is electrically insulating and has a larger relative permittivity than air are interposed side by side in the direction in which the moving electrode 20 and the first silicon substrate 11 are apart.

Whereas in related art there has only been a space between the moving electrode and the face of the supporting substrate constituting the fixed electrode, in this embodiment, in addition to the space 30, a silicon oxide film 13 constituting an insulating layer with a larger relative permittivity than air is interposed between the moving electrode 20 and the first silicon substrate 11 constituting the fixed electrode. The relative permittivity of air is 1, and the relative permittivity of the silicon oxide film 13 is 3.84.

Consequently, the permittivity of the capacitor part between the moving electrode 20 and the face of the first silicon substrate 11, i.e. of the detection capacitor part, is greater than in related art, and as a result it is possible to increase the detection capacitance without increasing the facing area of the moving electrode 20 and the first silicon substrate 11.

Therefore, with this preferred embodiment, in the capacitance-type semiconductor acceleration sensor S1, it is possible to increase detection sensitivity while minimizing increase of the size of the sensor.

Specific detection sensitivity increase results obtained with the acceleration sensor S1 of this embodiment in which a silicon oxide film 13 is used as an insulating layer will now be discussed. Here, the space 30 will be assumed to be a layer of air.

Figure 5A:
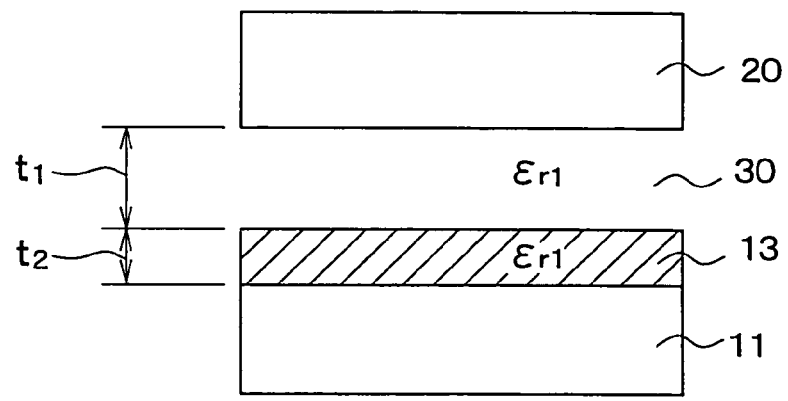
FIG. 5A is a view showing a capacitance model according to the preferred embodiment.
Figure 5B:
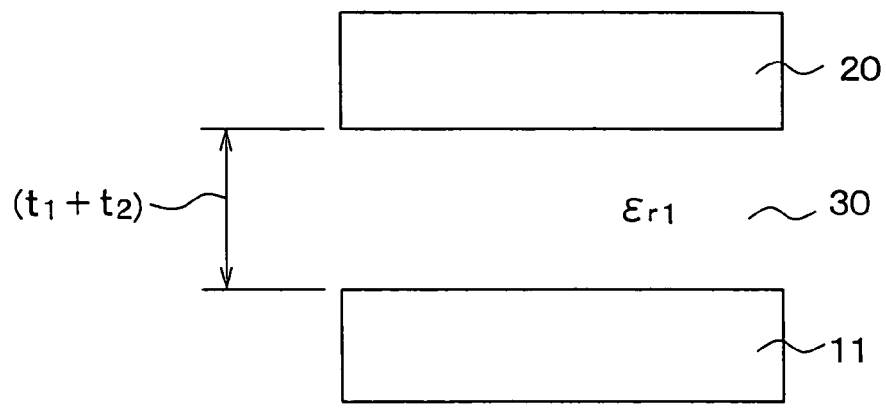
FIG. 5B is a view showing a conventional capacitance model.

FIG. 5A illustrates the case of an acceleration sensor S1 of this embodiment wherein the dielectric between the moving electrode 20 and the fixed electrode (first silicon substrate) 11 is made up of a silicon oxide film 13 and an air layer (space) 30, and FIG. 5B a case of related art wherein the dielectric between the moving electrode 20 and the fixed electrode 11 consists of a layer of air only.

Here, the permittivity of a vacuum will be written $\in_0$, the relative permittivity of the air layer 30 (i.e. the relative permittivity of air) will be written $\in_{r1}$, the relative permittivity of the silicon oxide film 13 (i.e. the relative permittivity of $SiO_2$) will be written $\in_{r2}$, and the respective thicknesses of the air layer 30 and the silicon oxide film 13 in the direction in which the two electrodes 20, 11 are apart will be written $t_1$ and $t_2$. In FIG. 5B, $(t_1+t_2)$ is the thickness of the air layer 30 between the electrodes 20, 11.

Then, if the capacitances per unit area of the electrodes 20, 11 in FIGS. 5A and 5B are written Ca and Cb, these capacitances Ca, Cb are given by expressions 1 and 2.

$$Ca=\in_0/(t_1/\in_{r1}+t_2/\in_{r2}) \quad \text{Exp. 1}$$

$$Cb=\in_0/(t_1/\in_{r1}+t_2/\in_{r1}) \quad \text{Exp. 2}$$

Here, because the relative permittivity of air $\in_{r1}$ is 1, the capacitances Ca and Cb are as shown by the following expressions 3 and 4.

$$Ca=\in_0/(t_1+t_2/\in_{r2}) \quad \text{Exp. 3}$$

$$Cb=\in_0/(t_1+t_2) \quad \text{Exp. 4}$$

And from these expressions 3 and 4, the ratio Ca/Cb of the capacitance Ca in this embodiment to the capacitance Cb in the case of the related art with the air layer 30 only is given by the following expression 5.

$$Ca/Cb=(t_1+t_2)/(t_1+t_2/\in_{r2}) \quad \text{Exp. 5}$$

Figure 6:
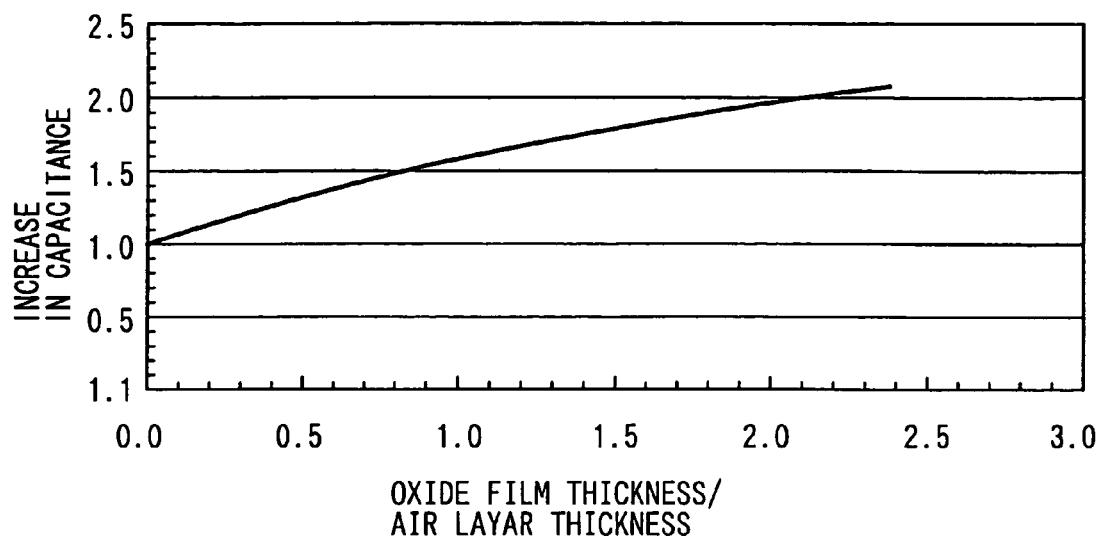
FIG. 6 is a view showing the relationship between a ratio of oxide film thickness/air layer thickness and a capacitance increase.

The result of obtaining the relationship between the ratio $t_2/t_1$ of the thickness $t_2$ of the silicon oxide film 13 to the thickness $t_1$ of the air layer 30 and the capacitance of the overall dielectric on the basis of this expression 5 is shown in FIG. 6.

In FIG. 6, the horizontal axis shows oxide film thickness/air layer thickness, i.e. the ratio $t_2/t_1$, and the vertical axis shows increase in capacitance. The value on the vertical axis at 0 on the horizontal axis is the capacitance in the case wherein the dielectric between the electrodes 20 and 11 consists entirely of the air layer 30, i.e. the capacitance Cb of related art shown in FIG. 5B, and the capacitance increase is shown with this capacitance Cb standardized to 1.

It can be seen from FIG. 6 that as the proportion of the thickness of the silicon oxide film 13 in the dielectric between the electrodes 20, 11 increases, the capacitance increases. And it can be seen that for example to double the capacitance it is necessary to make the oxide film thickness/air layer thickness ratio 2.05, that is, to make the thickness $t_2$ of the silicon oxide film 13 2.05 times the thickness $t_1$ of the air layer 30.

Figure 7:
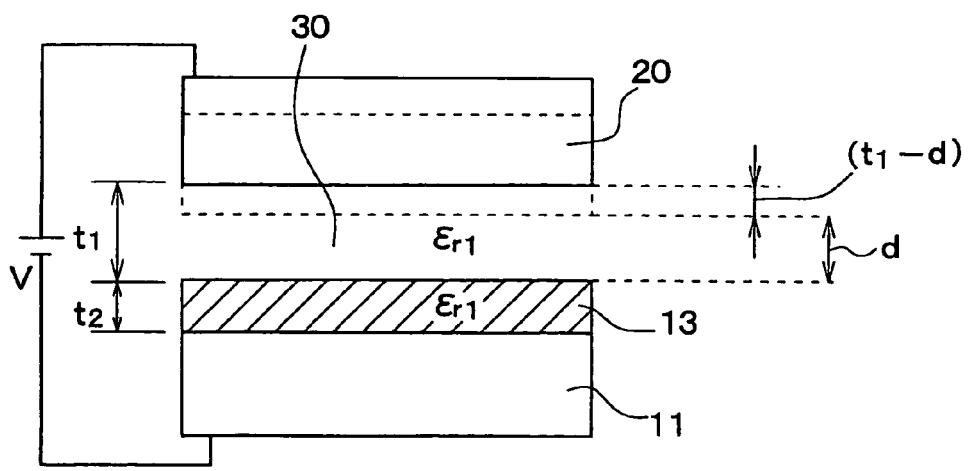
FIG. 7 is a view showing a displacement model of a moving electrode when a acceleration is applied.

And, when the thickness $t_1$ of the air layer 30 and the thickness $t_2$ of the silicon oxide film 13 have been decided, operation taking account of dynamic range is effected in the following way. FIG. 7 is a view showing a displacement model of the moving electrode 20.

FIG. 7 shows the moving electrode 20 in the acceleration sensor S1 of this embodiment having displaced by a displacement ($t_1-d$) under an acceleration G. That is, in FIG. 7, the thickness of the air layer 30 after the displacement is d. And the voltage across the electrodes 20, 11 is V.

At this time, if the electrostatic force $F_{ed}$ between the electrodes 20, 11 is written $F_{ed}$, the spring constant of the spring parts 22 is written k and the spring force of the spring parts 22 is written $F_{sp}$, then the electrostatic force $F_{ed}$ and the spring force $F_{sp}$ are respectively given by expression 6 and expression 7.

$$F_{ed} = \epsilon_0 \cdot V^2/2\{1/(d+t_2/\epsilon_{r2})\}^2 \quad \text{Exp. 6}$$

$$F_{sp} = k \cdot (t_1-d) \quad \text{Exp. 7}$$

And when the displacement of the move electrode 20 is balanced, that is, in the equilibrium state, $F_{ed}=F_{sp}$, and from this relationship and expression 6 and expression 7, the relationship given by the following expression 8 can be derived.

$$V = (2k/\epsilon_0)^{0.5} \cdot (d+t_2/\epsilon_{r2}) \cdot (t_1-d)^{0.5} \quad \text{Exp. 8}$$

Figure 8:
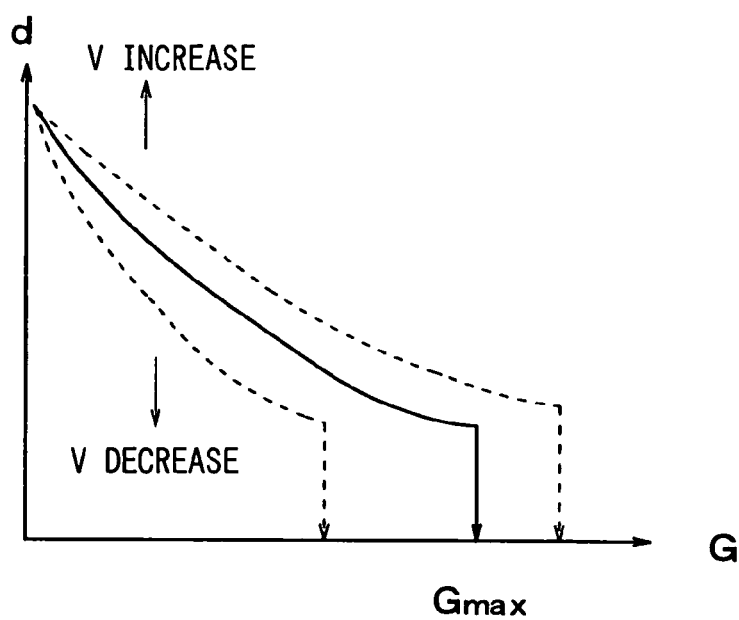
FIG. 8 is a view showing a relationship between the applied acceleration G and the air layer thickness d after displacement.

As shown in FIG. 8, as the applied acceleration G increases, the thickness d of the air layer 30 after the displacement narrows, and at an applied acceleration G of a certain size the moving electrode 20 and the silicon oxide film 13 make contact and the thickness d becomes 0.

The applied acceleration G of when the thickness d becomes 0 is a maximum dynamic range acceleration Gmax. As shown in FIG. 8, as the voltage V across the electrodes 20, 11 decreases, this maximum dynamic range acceleration Gmax increases. Operation of the acceleration sensor S1 is carried out below the maximum dynamic range acceleration Gmax.

Figure 9:
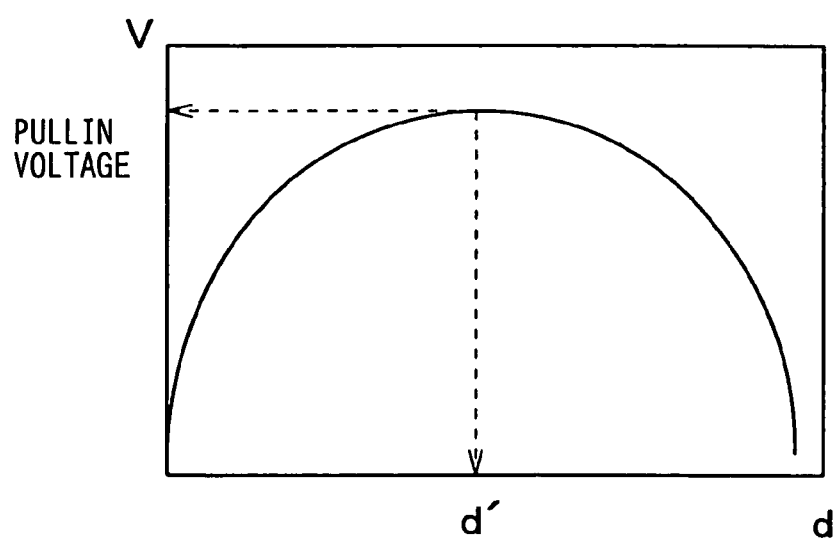
FIG. 9 is a view illustrating a relationship between the air layer thickness d after the displacement and a voltage V across both the electrodes.

FIG. 9 is a view illustrating the relationship shown in expression 8 as a relationship between the thickness d of the air layer 30 after a displacement and the voltage V across the electrodes 20, 11.

As shown in FIG. 9, when the voltage V is impressed and the gap between the electrodes 20, 11 narrows, the rate of change of the voltage changes from positive to negative at a pull-in voltage. Therefore, the state of the thickness d' corresponding to the pull-in voltage in FIG. 9 is the maximum dynamic range state.

This is the same as saying that the maximum dynamic range state is when the first-order differential with respect to d of expression 8 $\partial V/\partial d$ is 0. This relationship $\partial V/\partial d=0$ is shown in the following expression 9.

$$\partial V/\partial d = (2k/\epsilon_0)^{0.5} \cdot (t_1-d)^{0.5} - \quad \text{Exp. 9}$$
$$0.5 \cdot (2k/\epsilon_0)^{0.5} \cdot (d+t_2/\epsilon_{r2}) \cdot (t_1-d)^{0.5}$$
$$= 0$$

And from this expression 9, the relationship shown by the following expression 10 can be obtained.

$$d = 2/3 \cdot (t_1 - t_2/2 \cdot \epsilon_{r2}) \quad \text{Exp. 10}$$

As shown by this expression 10, in the acceleration sensor S1 of this embodiment, if the thickness $t_1$ of the air layer 30 and the thickness $t_2$ of the silicon oxide film 13 are decided, the dynamic range is also decided.

That is, because if the thickness d of the air layer 30 after a displacement is smaller than the right hand side of expression 10 the electrodes 20, 11 will touch, the acceleration sensor S1 is operated in a range such that the thickness d of the air layer 30 after the displacement is greater than the right side of expression 10.

Although in the preferred embodiment described above a silicon oxide film was used as the insulating layer 13, it is also possible to use some other electrically insulating film with a relative permittivity greater than that of air, such as a silicon nitride film (SiN film), which has a relative permittivity of 9.0, or a SiON film (relative permittivity: 3.84 to 9.0).

Figure 11:
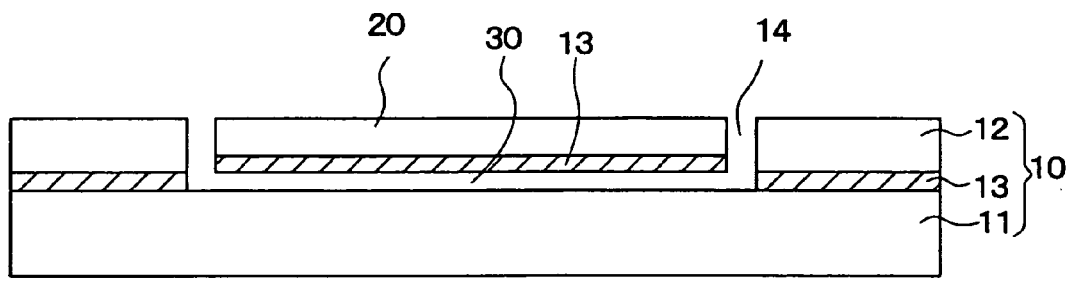
FIG. 11 is a schematic sectional view showing the second variation of the preferred embodiment.
Figure 12:
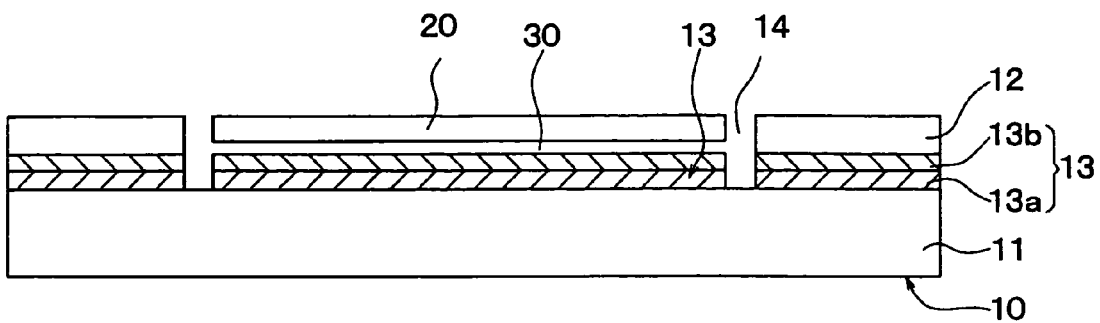
FIG. 12 is a schematic sectional view showing the third variation of the preferred embodiment.

Next, the schematic sectional constructions of acceleration sensors which are variations of the preferred embodiment described above are shown in FIG. 10, FIG. 11 and FIG. 12. These figures FIG. 10 to FIG. 12 show sectional constructions corresponding to the section shown in FIG. 2, and basically these constructions can be manufactured using known semiconductor fabrication technology.

Figure 10:
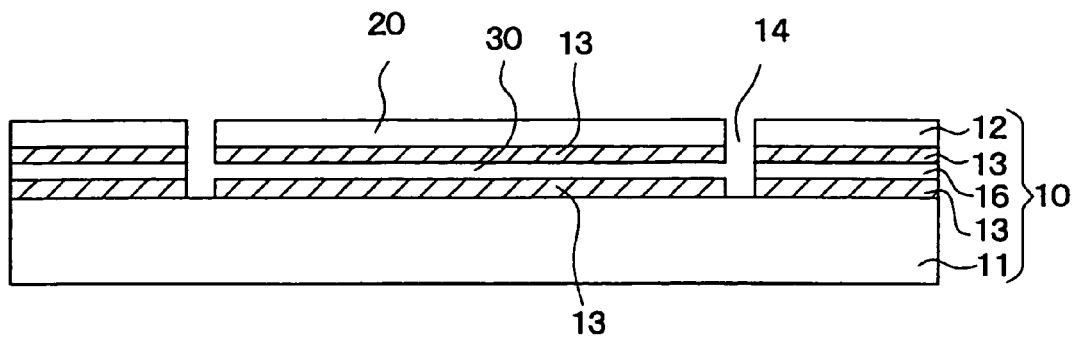
FIG. 10 is a schematic sectional view showing the first variation of the preferred embodiment.

A first variation shown in FIG. 10 uses a SOI substrate 10 having two embedded oxide films 13, made by stacking together a first silicon substrate 11, a silicon oxide film 13, a third silicon substrate 16, an oxide film 13, and a second silicon substrate 12.

A silicon oxide film 13, which is an insulating layer, is provided on the mutually facing sides of both the moving electrode 20 and the first silicon substrate 11 serving as a fixed electrode and a supporting substrate.

In this case also, like the acceleration sensor S1 shown in FIG. 1, the sensor can be manufactured by performing trench etching from the second silicon substrate 12 side to form slits 14 and removing the third silicon substrate 16 part below the moving electrode 20 by side etching.

A second variation shown in FIG. 11 uses the same SOI substrate 10 as the acceleration sensor S1 shown in FIG. 1, and has a silicon oxide film 13 constituting an insulating layer provided on the side of the moving electrode 20 facing the first silicon substrate 11.

In this case, the sensor can be manufactured for example by successively performing trench etching of the SOI substrate 10 from the second silicon substrate 12 side, sacrificial layer etching of the oxide film 13, side etching of the second silicon substrate 12, oxidation, and surface silicon oxide film etching.

A third variation shown in FIG. 12 has an insulating layer 13 made up of a plurality of insulating films of different types, and in the example shown in the figure the insulating layer 13 is of a two-layer construction made up of a silicon oxide film 13a and a silicon nitride film 13b provided on the first silicon substrate 11 side.

When the insulating layer 13 is made up of a plurality of insulating films, although of course there may be three or more layers and three or more types of insulating film, each type of insulating film used must have a relative permittivity larger than that of air.

This third variation can be manufactured for example by using a SOI substrate 10 having an embedded two-layer insulating film made up of a silicon oxide film 13a and a silicon nitride film 13b, and for example performing trench etching from the second silicon substrate 12 side to form slits 14 and removing the second silicon substrate 12 part below the moving electrode 20 by side etching as in the acceleration sensor S1 shown in FIG. 1.

(Other Preferred Embodiments)

Besides sensors of the kind shown in the foregoing preferred embodiment having a supporting substrate constituting a fixed electrode made of a semiconductor and above one side of this and facing it across a gap a moving electrode made of a semiconductor and displaceable in the thickness direction of the supporting substrate, the invention can also be applied for example to sensors such as that shown in Patent Document 2 having combtooth shaped moving and fixed electrodes.

In the case of such combtooth shaped moving and fixed electrodes, the electrodes face each other at the side faces of the combteeth. As a method of forming an insulating layer on the side faces of the combteeth, for example the combtooth electrodes are formed by trench etching and then side face oxidation is carried out.

And, besides acceleration sensors, the invention can also be applied as a capacitance-type semiconductor dynamic quantity sensor to for example angular velocity sensors and pressure sensors and the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A semiconductor dynamic quantity sensor having a moving electrode and a fixed electrode apart from and facing each other formed by processing a semiconductor substrate, the semiconductor dynamic quantity sensor detecting an applied dynamic quantity on the basis of a capacitance change between the moving electrode and the fixed electrode accompanying displacement of the moving electrode occurring when the dynamic quantity is applied, wherein a space and an electrically insulative insulating layer having a larger relative permittivity than air are interposed between the moving electrode and the fixed electrode side by side in the direction in which the electrodes are apart, wherein the insulating layer insulates the moving electrode from the fixed electrode, and the insulating layer is formed by etching a portion of the moving electrode.

2. A semiconductor dynamic quantity sensor according to claim 1, wherein the insulating layer is provided on at least one of the mutually facing sides of the moving electrode and the fixed electrode.

3. A semiconductor dynamic quantity sensor according to claim 2, wherein the insulating layer is provided on both of the mutually facing sides of the moving electrode and the fixed electrode.

4. A semiconductor dynamic quantity sensor according to claim 1, wherein the insulating layer is made up of a plurality of insulating films of different types.

5. A semiconductor dynamic quantity sensor having a supporting substrate constituting a fixed electrode made of a semiconductor and disposed apart from and facing one side of a moving electrode made of a semiconductor and displaceable in the thickness direction of the supporting substrate, the semiconductor dynamic quantity sensor detecting an applied dynamic quantity on the basis of a capacitance change between the moving electrode and one side of the supporting substrate accompanying displacement of the moving electrode occurring when the dynamic quantity is applied, wherein a space and an electrically insulative insulating layer having a larger relative permittivity than air are interposed between the moving electrode and one side of the supporting substrate side by side in the direction in which the moving electrode and the supporting substrate are apart, wherein the insulating layer insulates the moving electrode from the fixed electrode, and the insulating layer is formed by etching a portion of the moving electrode.

6. A semiconductor dynamic quantity sensor according to claim 5, wherein the insulating layer is provided on at least one of the mutually facing sides of the moving electrode and the supporting substrate.

7. A semiconductor dynamic quantity sensor according to claim 6, wherein the insulating layer is provided on both of the mutually facing sides of the moving electrode and the supporting substrate.

8. A semiconductor dynamic quantity sensor according to claim 5, wherein the insulating layer is made up of a plurality of insulating films of different types.

9. A semiconductor dynamic quantity sensor having a moving electrode and a fixed electrode apart from and facing each other formed by processing a semiconductor substrate, the semiconductor dynamic quantity sensor detecting an applied dynamic quantity on the basis of a capacitance change between the moving electrode and the fixed electrode accompanying displacement of the moving electrode occurring when the dynamic quantity is applied, wherein a space and an electrically insulative insulating layer having a larger relative permittivity than air are interposed between the moving electrode and the fixed electrode side by side in the direction in which the electrodes are apart, wherein the insulating layer is provided on at least one of the mutually facing sides of the moving electrode and the fixed electrode, wherein the insulating layer is made up of a plurality of insulating films of different types, wherein the insulating layer insulates the moving electrode from the fixed electrode, and the insulating layer is formed by etching a portion of the moving electrode.

10. A semiconductor dynamic quantity sensor according to claim 9, further comprising an electrode for outputting an electrical potential of the fixed electrode from a surface where the moving electrode is formed.

11. A semiconductor dynamic quantity sensor according to claim 5, further comprising an electrode for outputting an electrical potential of the fixed electrode from a surface where the moving electrode is formed.

12. A semiconductor dynamic quantity sensor according to claim 1, further comprising an electrode for outputting an electrical potential of the fixed electrode from a surface where the moving electrode is formed.

* * * * *